Jan. 1, 1935.  L. W. MOULTON  1,986,352
LIBRARY CARD PRINTING MACHINE
Filed Jan. 28, 1931  6 Sheets-Sheet 1
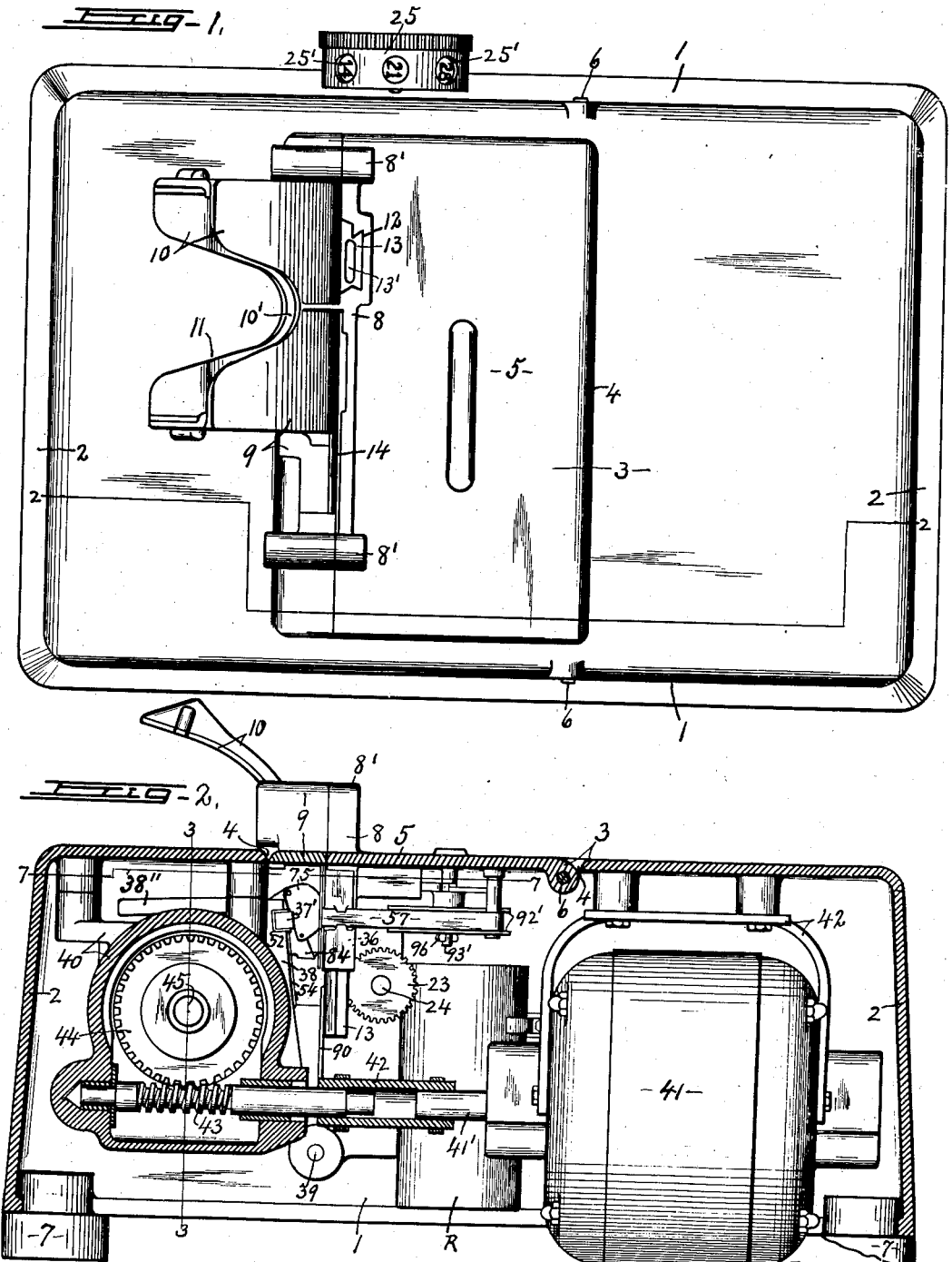

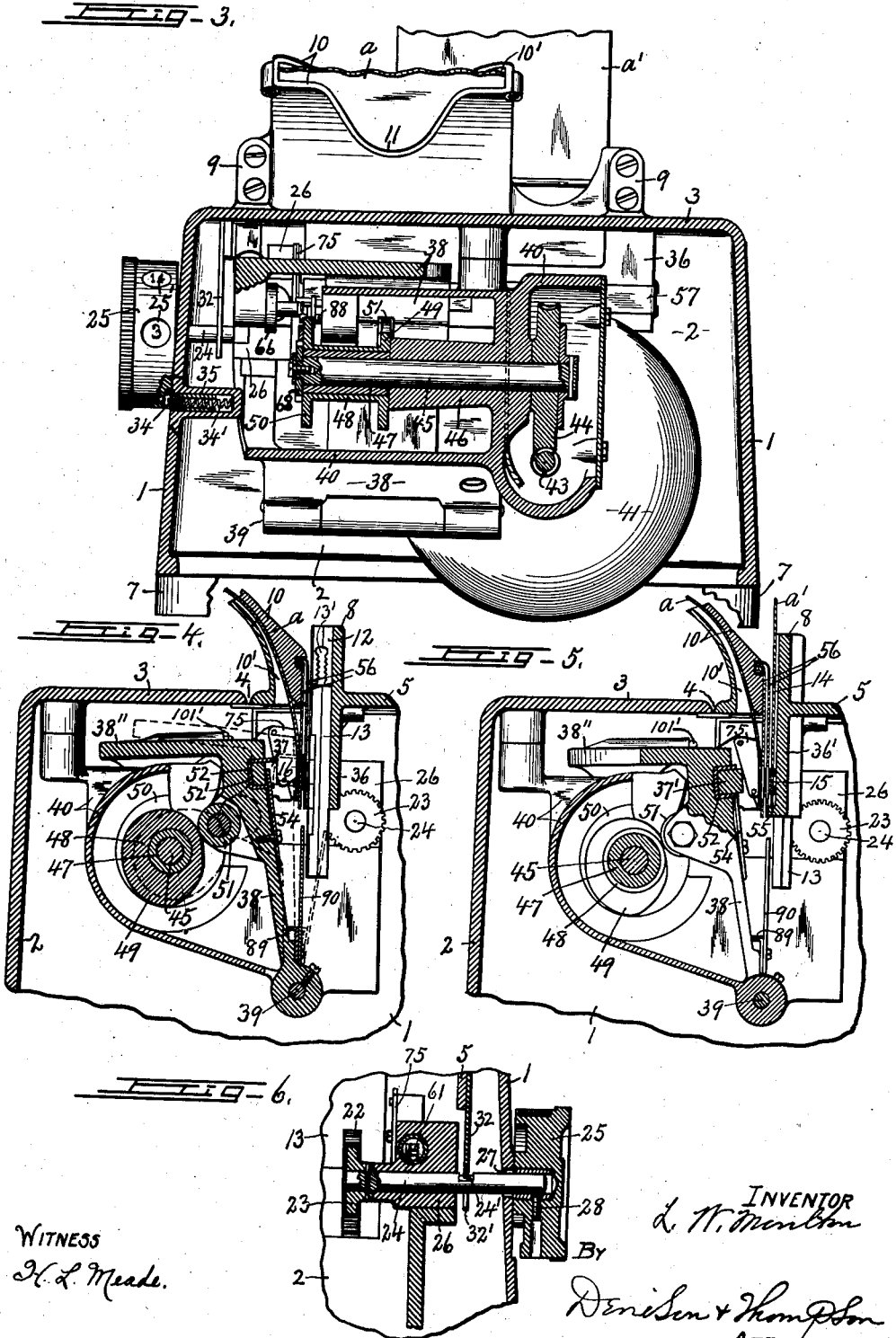

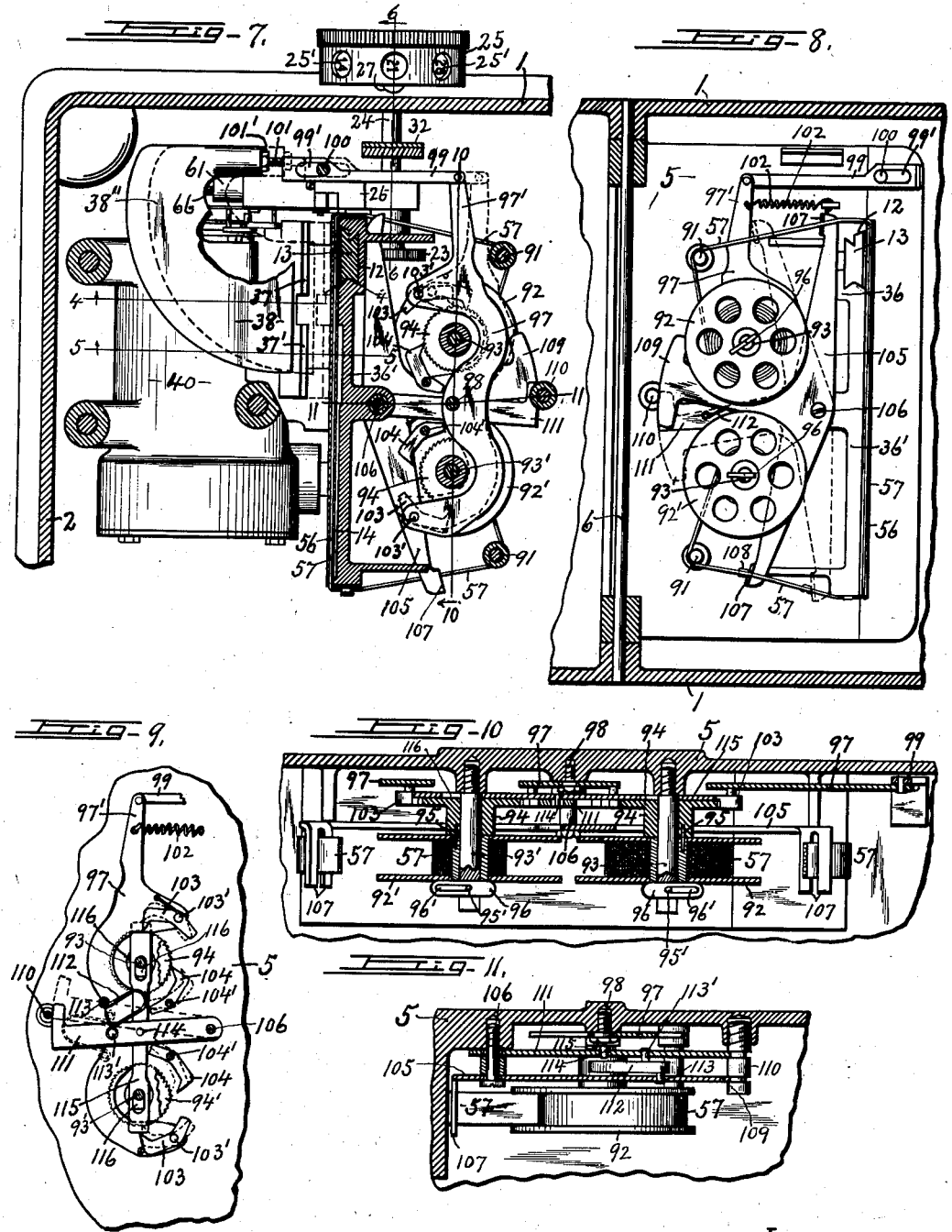

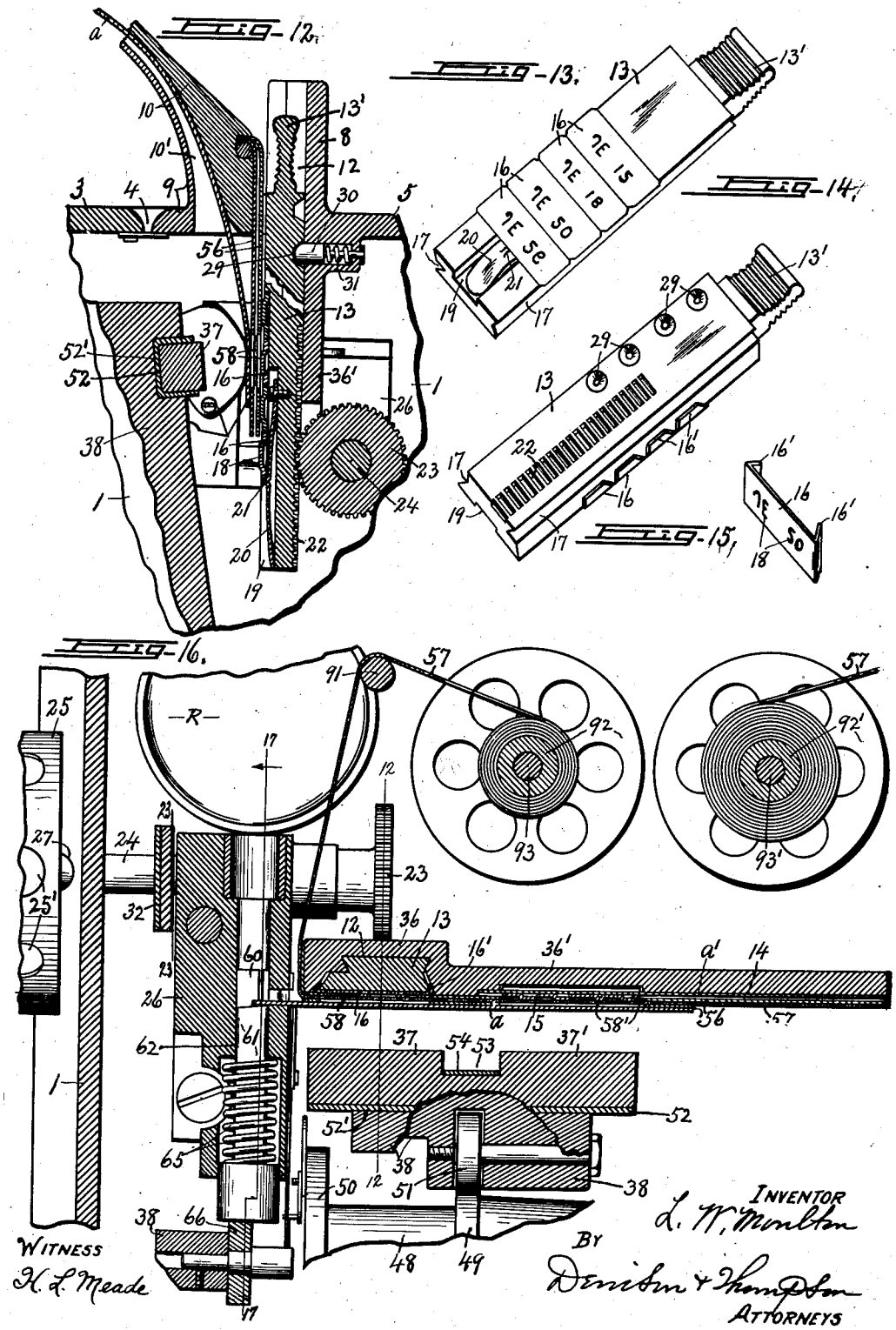

Jan. 1, 1935.　　　　L. W. MOULTON　　　　1,986,352
LIBRARY CARD PRINTING MACHINE
Filed Jan. 28, 1931　　　　6 Sheets-Sheet 5
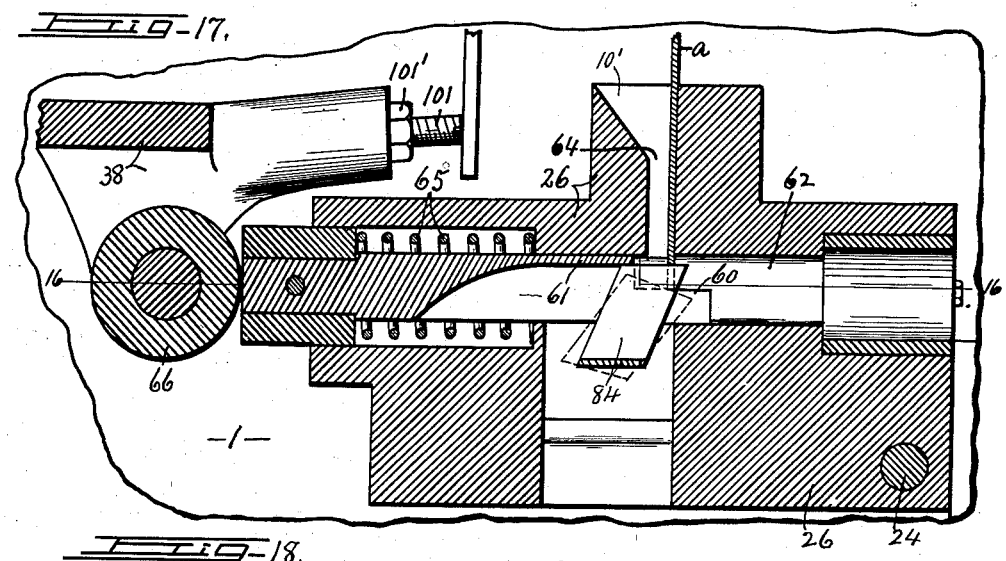
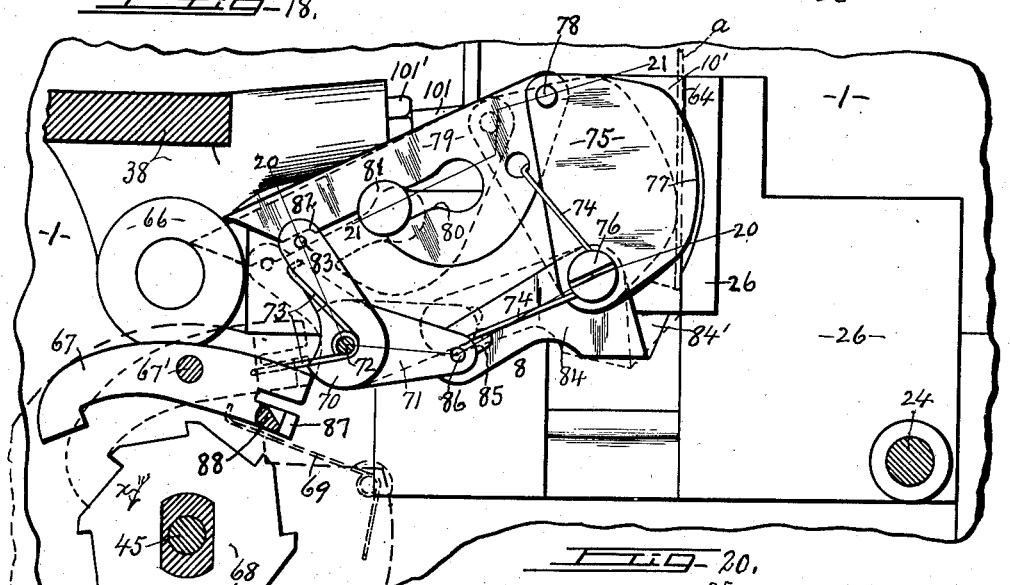
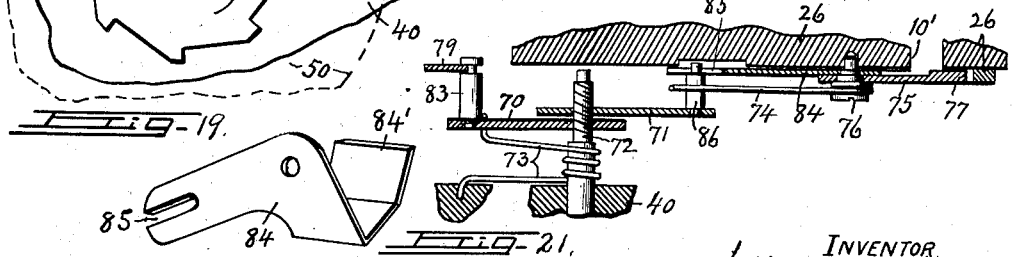
WITNESS
H. L. Meade.
INVENTOR
L. W. Moulton
By
Denison & Thompson
ATTORNEYS Jan. 1, 1935.  L. W. MOULTON  1,986,352
LIBRARY CARD PRINTING MACHINE
Filed Jan. 28, 1931   6 Sheets—Sheet 6
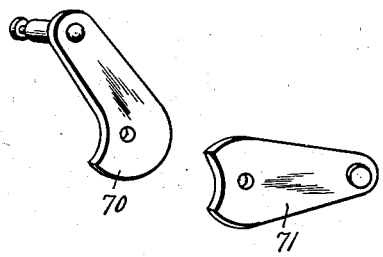
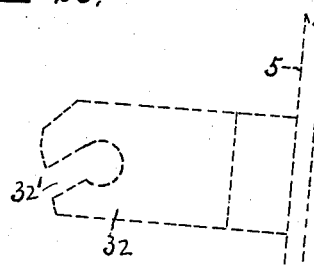
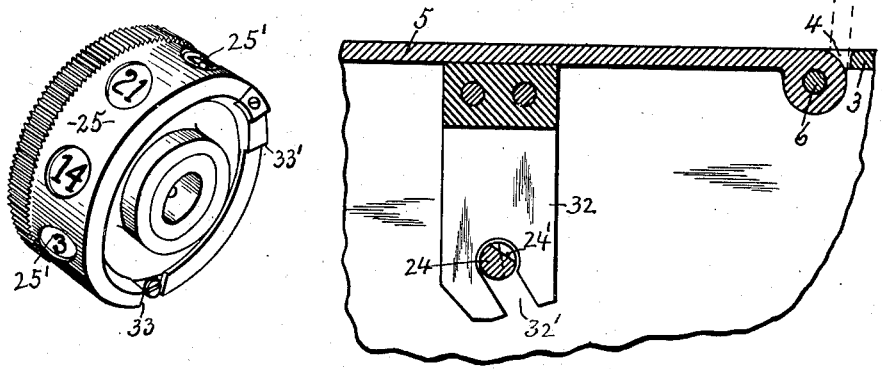
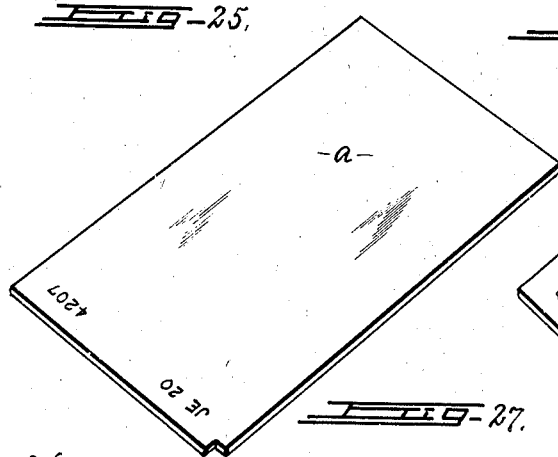
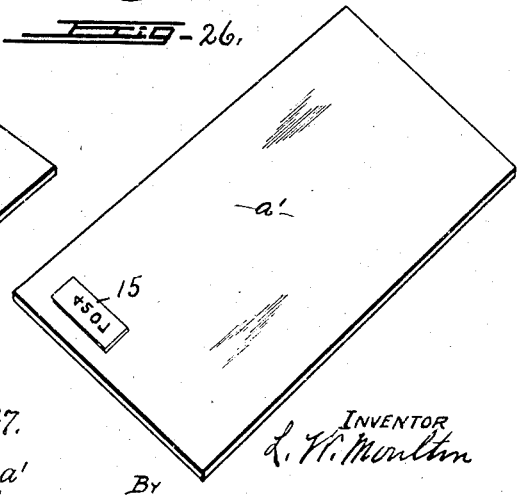
INVENTOR
L. W. Moulton
By
Denison & Thompson
ATTORNEYS
WITNESS
H. L. Meade.

Patented Jan. 1, 1935

1,986,352

UNITED STATES PATENT OFFICE 1,986,352

LIBRARY CARD PRINTING MACHINE

Lloyd W. Moulton, Syracuse, N. Y., assignor to Gaylord Bros. Inc., Syracuse, N. Y., a corporation of New York Application January 28, 1931, Serial No. 511,816

13 Claims. (Cl. 101—93)

This invention relates to a portable printing machine of the class set forth in my pending application Serial No. 394,531, filed September 23, 1929, in that it is adapted to be used more particularly in circulating libraries, and other places where books and other articles are temporarily loaned to borrowers, for recording the dates of issue and return of such articles, together with the identification characters of the borrower upon suitable cards commonly known, respectively, as "librarian's card" and "borrower's card."

The main object of the present invention is to provide a simple, practical and durable machine of this character by which the records may be more conveniently, expeditiously and noiselessly impressed upon the cards than has heretofore been practised.

One of the specific objects is to provide power-driven means for operating the printing couple in which the printing operation is automatically controlled by the insertion and removal of one of the cards between and from the printing elements as distinguished from the hand-operated printing means disclosed in my pending application referred to.

Another object is to enclose the entire printing mechanism, cutting mechanism and power unit for driving said mechanisms, within or upon a single housing so that the complete machine may be relatively small, compact and easily portable from place to place by the user.

A further object is to mount the ink-ribbon and its feeding mechanism directly upon a hinged part or lid of the housing arranged in such manner that when the lid is opened, free access may be had to the various parts of the power unit and printing couple and also to the ribbon feeding means, without otherwise displacing other parts of the machine.

Other objects and uses will be brought out in the following description.

In the drawings:—

Figure 1 is a top plan of a library card printing machine embodying the various features of my invention.

Figure 2 is a longitudinal vertical sectional view taken in the plane of line 2—2, Figure 1, except that the motor is shown in elevation.

Figure 3 is a transverse vertical sectional view taken in the plane of line 3—3, Figure 2, except that the upper portion of the card guide is shown in full, portions of the borrower's card and librarian's card being shown in operative position for printing.

Figures 4 and 5 are detail longitudinal vertical sectional views taken respectively in the planes of lines 4—4 and 5—5, Figure 7.

Figure 6 is a detail transverse vertical sectional view taken in the plane of line 6—6, Figure 7.

Figure 7 is a horizontal sectional view just beneath the top of the housing, taken in the plane of line 7—7, Figure 2, showing more particularly the printing couple, ribbon feed mechanism and card guide, together with the carrier for the date-type plates.

Figure 8 is an inverted plan of the ribbon feeding mechanism and adjacent portions of the housing upon which it is mounted.

Figure 9 is an inverted plan of the same ribbon feeding mechanism shown in Figure 8, except that the reels for the ribbon are removed, and their respective spindles shown in section, the shifting lever being also omitted.

Figure 10 is an enlarged detail vertical sectional view of the ribbon-feeding mechanism taken in the plane of line 10—10, Figure 7, showing also the adjacent portion of the top of the housing.

Figure 11 is a detail vertical sectional view taken in the plane of line 11—11, Figure 7.

Figure 12 is an enlarged detail vertical sectional view taken approximately in the plane of line 12—12, Figure 16, showing more particularly the vertically adjustable type-plate carrier and its operating means, together with a portion of the platen and card guide.

Figures 13 and 14 are perspective views of the type-plate carrier showing the obverse and reverse sides thereof.

Figure 15 is a perspective view of one of the detached type-plates.

Figure 16 is an enlarged horizontal sectional view through the printing couple and ribbon reels, showing also the means for punching out a portion of the card.

Figure 17 is an enlarged vertical sectional view through the punch guide and punch therein, together with the adjacent portion of one of the card-operated levers.

Figure 18 is an enlarged inner face view of the card-actuated mechanism for establishing driving connection between the motor-actuated counter-shaft and movable element of the printing couple, the parts being shown in their normal inactive positions, while a portion of the card is shown by dotted lines.

Figure 19 is a perspective view of one of the detached card-actuated levers shown in Figures 17 and 18.

Figures 20 and 21 are detail sectional views taken respectively on lines 20—20 and 21—21, Figure 18.

Figure 22 shows a perspective view of the two cooperative detents which serve to hold the clutch pawl in its inoperative position.

Figure 23 is a detail sectional view through the top of the housing, showing the lid-locking means.

Figure 24 is a perspective view of the detached handle or knob as a part of the means for moving the type bar vertically and also for locking and releasing the lid.

Figures 25 and 26 are perspective views of the borrowers card and the librarian's card respectively.

Figure 27 is a detail sectional view through the type plate and adjacent portion of the card shown in Figure 26.

As illustrated, this machine comprises a substantially rectangular main supporting frame or housing of slightly greater length than width and provided with upwardly converging side walls 1, similar upwardly converging end walls 2 and a top wall 3, the latter being provided with an opening 4 normally closed by a lid section 5 which is hinged or pivoted at 6 to one of the end walls of the opening 4 to swing vertically to and from a closed position or from a substantially horizontal position to, and slightly beyond a vertical position to allow the lid to remain open when fully opened.

This lid section 5 extends nearly the full width of the top of the housing, but is relatively narrow lengthwise of said top and located substantially midway between the ends thereof as shown more clearly in Figure 2 for receiving and supporting the feeding mechanism for the ink ribbon described.

The housing is hollow throughout the major portion of its area, and is provided with suitable supporting feet 7 secured to its lower edges near the four corners thereof, thereby allowing a ventilating space for the circulation of air through the interior of the housing to prevent excessive rise of temperature of the air therein by the operation of the motor and other moving parts.

For convenience of description, the lefthand end of the housing may be regarded as the front of the machine.

The lid 5 is provided near its front edge with an upwardly projecting flange 8 having laterally spaced posts 8' to which is bolted or otherwise removably secured a forward extension 9 which is adapted to move with the lid about its pivotal hinge 6, said extension 9 being provided with an upwardly and forwardly curved card guide 10 having a guide opening 10' for receiving a card a, as shown more clearly in Figures 1 to 5 inclusive, and Figure 12, the card being also shown in Figure 25 and is similar to that shown and described in Patent No. 1,818,830 issued to George Van Dusen August 11th, 1931.

The central portion of the upper front end of the card guide 10 is cut out at 11 to facilitate the insertion and removal of the card by hand into and out of the guide opening 10' which is of sufficient depth from front to rear to permit the card to slide easily therein and is of about the same width as that of the card, so that the side walls of the guide may hold the card against undue lateral movement, and thereby to facilitate the making of impressions thereon in parallel lines, one above the other in a manner hereinafter more fully explained.

The lid 5 is also provided with a vertical guide opening 12 located just at the rear of the section 9 for receiving a vertically slidable type-plate carrier 13 having its upper end provided with a handle 13' by which it may be inserted and removed into and from the opening 12, as shown more clearly in Figures 12, 13 and 14.

An additional vertical guide opening 14 is formed in the lid 5 just at the rear of, and in proximity to, the card guide 10 for receiving a type-bearing card a' having a type plate 15 incorporated therein as shown more clearly in Figure 26, both cards being rectangular in form, and of substantially the same size, so that if necessary or desirable, the card a' may be inserted in the guide 10 for receiving date impressions thereon.

Substantially one-half of the card guide 14 extends from one side across approximately half of the card guide 10 or from the center of the latter guide beyond the righthand edge thereof, a distance approximately equal to the overlap of the guides so that when the card a' is inserted in the guide 14 its type plate 15 will be brought into registration with the righthand half of the previously inserted card a in the guide 10 for impressing the type on the plate 15 on the card a' during the printing operation, as will be hereinafter more fully explained.

The card guide 14 is arranged in transverse alignment with the guide opening 12 for the type bar 13 so that the type of the bar 13 and card a' will be disposed in the same transverse plane to cooperate with a movable platen, presently described, for impressing the type characters of the type bar 13 and type card a' upon the card a when the latter is inserted in its guide 10, Figures 1 to 5 inclusive and Figures 12 and 16.

The opposite longitudinal edges of the type bar 13 and corresponding side walls of the guide opening 12 are dovetailed in cross section to facilitate the vertical movement of the type bar and to hold it against relative forward and rearward movement when adjusted for use, the dovetailed edges of the type bar serving also as a means for receiving and retaining a plurality of type plates 16, as shown more clearly in Figures 12 to 15 inclusive.

As illustrated, the type bar 13 is arranged to receive a plurality of, in this instance four, type plates 16 arranged edge to edge in sequence thereon, as shown in Figures 13 and 14, by sliding engagement therewith and having their ends provided with inturned flanges 16' adapted to engage in lengthwise grooves 17 in the opposite lengthwise edges of the bar 13 to hold them against forward displacement, it being understood that the type plates extend across the front face of the bar 13, as shown in Figure 13.

These type plates are provided with negative type 18 embossed in their front faces and representing different dates of borrowing and return of the book or other article to be printed upon the card a when inserted in the guide 10 immediately preceding the operation which is controlled by the insertion and removal of the card in a manner hereinafter described.

The bar 13 is also provided with a central lengthwise groove 19 extending from the lower end thereof upwardly a limited distance for receiving a flat bow spring 20 which is under relatively light tension and is provided with a shoulder 21 for engaging the lower edge of the lowermost plate 16 to hold all of the plates against undue downward movement while the type bar 13 with the plates thereon is being used for printing purposes.

The spring 20 is yieldable under relatively light finger pressure to release the detent 21 from engagement with the lowermost plate 16, and thereby to permit the plates to be removed and replaced by other plates with different dates as may be necessary from time to time according to the periods of borrowing or return of the books or other articles.

Suitable means is provided for adjusting the type bar 13 vertically one type plate space at a time and for this purpose its rear face is provided with a toothed rack 22 meshing with a pinion 23, which is secured to a relatively short horizontal shaft 24 having a hand wheel 25 by which the shaft with the pinion 23 thereon may be rotated at will for adjusting the type bar 13 vertically.

This shaft 24 is journaled in a hardened steel bearing block 26 and extends outwardly through an opening 27 in the lefthand side 1 of the housing, while the hand wheel 25 is secured to the outer end thereof by a set screw 28 or equivalent fastening means, as shown more clearly in Figure 6.

The rear face of the type bar 13 is provided with a series of, in this instance four, recesses 29 arranged in vertical alignment at one side of the toothed rack 22 for receiving a detent 30 which is urged into engagement with the registering recess by a coil spring 31, as shown in Figure 12, the inner end of the detent 30 being rounded to allow it to be forced outwardly against the action of the spring 31 as the type bar 13 is shifted vertically to different positions, it being understood that the recesses 29 are spaced equal distances apart corresponding to the spacing of the type plates 16 on the front face of the type bar, as shown in Figures 12, 13 and 14.

The periphery of the indexing wheel 25 is provided with indexes 25' spaced circumferentially to correspond to the spacing of the recesses 29 and type plates 16 on the type bar 13 to indicate to the operator the position of adjustment of the type bar 13, and thereby to determine which one of the type plates 16 is in position for printing upon the card *a*.

Lid lock and release

This hand wheel 25 and its shaft 24 are also utilized for locking and releasing the lid 5 in and from its closed position, and for this purpose, the lid is provided with a relatively thin locking plate 32 depending from the underside thereof some distance from its pivot 6 and across a portion of the shaft 24, and has its lower end provided with a slot 32' for receiving the adjacent portion of the shaft 24, the upper end of the slot being circular and of slightly larger diameter than that of the shaft.

The portion of the shaft registering with the locking plate 32 is provided with a recess 24', thereby reducing its diameter to about the width of the lower end of the slot 32' so that when the wider portion of the shaft extends transversely of the upper end of the slot 32', as shown by full lines in Figure 23, it will lock the lid in its closed position, while on the other hand, if the shaft is turned to bring its narrower portion lengthwise of the slot 32' the lid will be released and may be opened.

In order that the position of the reduced portion of the shaft may be accurately determined by the position of the hand wheel 25, the inner end face of the latter is provided with stop shoulders 33 and 33' spaced circumferentially a distance apart corresponding approximately to the arc of movement required for shifting the type bar 13 vertically from one extreme position to the other, said stop shoulders being adapted to engage a stop pin 34 which is guided in a suitable socket 35 in the adjacent side 1 of the housing, and normally urged outwardly by a coil spring 34', as shown more clearly in Figure 3.

The type bar 13 is adapted to be removed and replaced through the upper open end of its guide 12 and is first moved downwardly in its guide until its upper type plate 16 is brought to its printing position, or in registration with the removable platen of the printing mechanism hereinafter described.

During this movement the pinion 23 and its shaft 24, together with the hand wheel 25 will be rotated in a clockwise direction until limited by the engagement of the shoulder 33 with the stop pin 34, the hand wheel being then in its starting position.

It is now evident that by turning the hand wheel 25 in a reverse direction to different positions as determined by the engagement of the detent 30 with one or the other of the recesses 29 in the type bar 13, the latter will be moved step by step upwardly to successively register its type plates 16 with the printing platen until limited by the engagement of the stop 33' with the stop pin 34.

During this rotation the wider part of the shaft 24 registering with the locking plate 32 will remain transversely of the slot 32' and thus continue the locking of the lid in its closed position.

The stop pin 34 may, however, be forced inwardly by the finger or other pointed instrument against the action of the spring 34' to move it out of engagement with the stop shoulder 33' and thus permit further rotation of the hand wheel 25 in a counter-clockwise direction which causes the narrower portion of the shaft 24 registering with the plate 32 to assume a position lengthwise of the slot 32' for releasing the lid and permitting the latter to be opened.

It is now evident that the locking and releasing of the lid 5 in and from its closed position is controlled by the hand wheel 25 and stop pin 34 and that when these printing operations from the type plates on the type bar 13 are to be repeated it is simply necessary to force the type bar downwardly, thereby restoring the hand wheel 25 to its starting position through the medium of the pinion 23 and shaft 24.

Printing mechanism

The rear walls of the type bar guide 12 and card guide 14 are extended downwardly from the underside of the lid 5 to form what may be termed fixed platens 36 and 36' respectively in opposed relation to movable platens 37 and 37' respectively, the latter being mounted upon a single support 38 which is hinged at 39 to swing about a horizontal axis toward and from the fixed platens 36 and 36', as shown more clearly in Figures 4, 5, 12 and 16, the pivotal pin 39 being located some distance below the lower ends of the platens 36 and 36', while the remaining portions of the platen support extend upwardly some distance above the lower end of the platens 36 and 36' across the front faces thereof, as shown more clearly in Figures 12 and 16.

The supporting shaft 39 for the movable platen support 38 is mounted upon a transmission case 40 which is bolted or otherwise secured to the underside of the top of the main supporting frame or housing, as shown more clearly in Figures 2, 4, 5 and 7, and supports not only the platen 38 but also the punch mechanism, the clutch and its operating mechanism and the means for transmitting motion from the power unit to the platen and punch to form what may be termed a power transmitting unit.

The power unit preferably comprises an electric motor 41 mounted in a suitable frame 42 which in turn is bolted or otherwise secured to the underside of the top wall of the main supporting frame or housing to extend downwardly therefrom for supporting a motor mainly at one side of the longitudinal center of the housing, as shown more clearly in Figures 2 and 3.

The motor shaft as 41' extends lengthwise of the housing and is connected by a flexible coupling 42 to a worm shaft 43 which is journaled in the case 40 and meshes with a worm gear 44, the latter being secured to a counter-shaft 45 which is journaled in a suitable bearing 46 in a plane above and at right angles to the worm shaft 43, as shown more clearly in Figures 2 and 3.

A sleeve bearing 47 is mounted upon the inner end of the shaft 44 for receiving and supporting a collar 48 which is rotatable relatively to the shaft 45 and is provided at one end with a cam 49 and at its other end with a disk 50. See Figure 3.

The shaft 45 carrying the collar 48, is located directly in front of the intermediate portion of the movable platen 38 which is provided with a roller bearing 51 engaging the perimeter of the cam 49 as a means of transmitting motion from the cam to the movable platen, as shown more clearly in Figure 4.

The platen members 37 and 37' are both formed upon and from a single piece of relatively hard rubber or equivalent material which is inserted in a grooved metal-supporting member 52, the latter being seated in a groove 52' in the rear face of the upper portion of the platen supporting member 38.

The platen members 37 and 37' are separated by an intervening recess 53 in which is seated the free end of a flat spring 54 having its lower end bolted or otherwise secured to the rear face of the platen supporting member 38 for normally holding the platen block and its supporting member 52 against accidental displacement, the upper end of the spring being adapted to be moved rearwardly out of the recess 53 to permit the removal and replacement of the platen block and its supporting member when desired.

The cam 49 is adapted to be rotated intermittingly one complete rotation at a time and at the end of each revolution its lower point will be in engagement with the roller 51 on the platen support 38, thereby allowing the latter to be spring actuated away from the fixed platen 36' to form an intervening opening into which the cards $a$ and $a'$ may be inserted across the printing faces of the type plates 16 and 15 respectively, as shown more clearly in Figures 3, 4 and 5.

The librarian's card $a'$ bearing the identification plate 15 is inserted from the top downward into its guide opening 14 until its type plate is brought into direct opposition to the corresponding platen member 37', said downward movement being limited by a stop shoulder 55 which, when engaged by the lower end of the card, serves to register the type plate 15 with the corresponding platen member 37', the card being removed by hand immediately following each printing operation, Fig. 5.

The card guide 10 is provided with a pair of relatively thin sheet metal stripper plates 56, extending downwardly therefrom into the interior of the housing between the rear faces of the platen members 37 and 37' and the guide openings 12 and 14, so that the rear stripper plate may form the front walls of said guide openings, while the front stripper plate forms a rear extension wall of the guide opening 10' for the card $a$, as shown more clearly in Figures 4, 5, 12 and 16.

These flat stripper plates are arranged in slightly spaced relation to receive between them an inking ribbon 57 which is arranged to traverse the front face of the stationary platen 36' in the horizontal plane of the platens 37 and 37', and, therefore, transversely of the machine, as will be hereinafter more fully described, said stripping plates being provided with openings 58 and 58' registering respectively with the platen members 37 and 37', and also with the corresponding type plates 16 and 15 so that when the platen members 37 and 37' are moved to their printing position the impressions of the type plates 16 and 15 will be made upon the rear face of the card $a$ through the medium of the inking ribbon 57 which extends lengthwise across the openings 58 and 58'. See Figures 4, 5, 12 and 16.

The card $a$ is inserted from the top downwardly through its guide opening 10' until limited by the engagement of the lower edge of its lefthand corner with a limiting stop 60 forming a rearward extension of a punch 61 which is reciprocally movable endwise in a guide opening 62 of the die block 26, as shown more clearly in Figures 16 and 17, said guide block being formed with a vertical guide opening 64 for the lower lefthand edge of the card $a$ communicating with the guide opening 62 so that when the card $a$ is inserted in the guide openings 10' and 64 the rearward movement of the punch 61 will cut away a relatively small portion of the lower lefthand corner of the card a vertical distance approximately equal to the line spacing of the type impressions to be made in sequence from the bottom upwardly upon said card when the platen 38 is moved to its printing position by the operation of the cam 49, thereby allowing the card to move downwardly step by step one line space following each printing operation to bring successive impressions of the type plates on different portions of the card $a$.

The punch 61 is preferably moved to its punching position against the action of a retracting spring 65 simultaneously with each printing operation or with the rearward movement of the platen 38, and for this purpose, the platen 38 is provided with a roller 66 bearing against the front end of the punch 61 as shown more clearly in Figures 16 and 17, the spring 65 also serving to return the platen 38 to its normal starting position following the printing and punching operation.

Card controlled clutch

Suitable means, including a clutch, is provided for transmitting rotary motion from the counter-shaft 45 to the collar 48 carrying the cam 49 and this clutch is controlled by a suitable mechanism brought into action by the insertion of the card $a$ into its guide opening 10' and for this purpose a clutch pawl 67, Figure 18, is pivoted at 67' to the outer end face of the disk 50 on the collar 48 to move into and out of engagement with a clutch member 68 consisting, in this instance, of a ratchet wheel secured to the adjacent end of the counter-shaft 45, as shown more clearly in Figures 3 and 18, the pawl 67 being adapted to be forced into engagement with the teeth of the ratchet wheel 67 by means of a spring 69, Figure 18.

The ratchet wheel 68 is adapted to be rotated continuously in the direction indicated by arrow $x$, Figure 18, through its connections with the continuously operating motor 41.

It is, therefore, obvious that if the pawl 67 is brought into engagement with any one of the teeth of the ratchet wheel 68, it will effect the rotation of the collar 48 and its cam 49, by which operation the platen 38 will be moved to and from its printing position to cause the impressions of the type plates 16 and 15 to be made upon the card $a$ through the medium of the inking ribbon 57.

The movement of the platen 38 to its printing position by the cam 49 will also move the punch 61 to its cutting position for cutting away the lower lefthand corner of the card $a$ and immediately following these operations the punch 61 and platen 38 will be returned to their normal starting positions by the spring 65.

As previously stated, the ratchet wheel 68 and its pawl 67 constitute a clutch for transmitting rotary motion from the counter-shaft 45 to the collar 48 having the cam 49 which in turn actuates the platen 38 and punch 61 against the action of the retracting spring 65.

The pawl 67, however, is normally held out of engagement with the ratchet wheel 68 by separate detents or cam levers 70 and 71, both of which are pivotally mounted for independent movement upon one and the same pivotal stud 72 which is secured to the transmission case 40, as shown more clearly in Figure 2. See also Figures 18 and 22.

The detent lever 70 is yieldingly held in its pawl-engaging position by means of a spring 73, while the detent lever 71 is yieldingly held in its pawl-engaging position by a spring 74, as shown more clearly in Figures 18 and 20. Both of these detents 70 and 71 are adapted to be tripped sequentially by suitable devices operated by the insertion of the card $a$ into its guide opening 10'.

One of these tripping devices comprises a rocking plate 75 having its lower end pivoted at 76 to the block 26 on the transmission case 40 to rock forwardly and rearwardly and has its rear edge curved to form a cam face 77 extending across the guide opening 10' near the lefthand side thereof as shown more clearly in Figures 7, 18 and 20, so that when the card $a$ is inserted in said guide opening, it will engage the cam face 77 with a sliding motion and thereby rock the upper end of the member 75 forwardly against the action of the spring 74.

The upper front end of the rocking plate 75 is pivotally connected at 78 to the rear end of a tripping lever 79 having a lengthwise slot 80 for receiving a guide pin 81, which is secured to the block 26, as shown more clearly in Figure 21, the front end of the slot 80 being open, while its rear end is enlarged to permit slight radial movement of the lever 79 relatively to the guide pin 81 when the enlargement of the slot is registered with said pin in a manner hereinafter described.

The lower edge of the front end of the upper arm of the lever 79 is cut away to form a shoulder 82 which is adapted to engage a pin 83 on the upper end of the detent 70 as the lever 79 is moved forwardly by the forward movement of the upper end of the rocking plate 75, thereby effecting the tripping of the detent 70 from holding engagement with the heel of the pawl 67 without tripping the detent 71.

In other words the insertion of the card $a$ into its guide opening 10' effects the tripping of the detent 70 through the medium of the rocking plate 75 and lever 79 which are moved to the position shown by dotted lines in Figure 18.

Then, as the downward movement of the card $a$ in its guide opening 10' continues, the lower edge of the card will be brought into engagement with another trip-lever 84 which is also pivotally mounted upon the pivotal bolt 76 to rock vertically. See Figure 17.

This trip-lever 84 is preferably of the bell-crank type, the rear end 84' of which normally extends across the guide slot 10' in a plane below the cam face 77 of the rocking plate 75 so that the downward movement of the card $a$ in its guide slot 10' will engage and rock the extension 84' of the lever 84 downwardly, thereby causing the opposite arm of the lever to rock upwardly to the position shown by dotted lines in Figure 18.

The front arm of the lever 84 is provided with a slot 85 for receiving a pin 86 on the rear end of the detent 71, as shown more clearly in Figures 18 and 20, whereby the upward movement of the front arm of the lever 84 by the engagement of the card $a$ with its rear end 84' will cause a corresponding upward movement of the rear end of the detent 71 for tripping the same from holding engagement with the heel of the pawl 67. See Figure 18.

Immediately upon the tripping of both of the detents 70 and 71 against the action of the springs 73 and 74, the pawl 67 will be released and forced into engagement with one of the teeth of the continuously rotating ratchet wheel 68, which in turn will transmit rotary motion to the collar 48 and its cam 49 for moving the platen 38 to its printing position and causing impressions of the type plates 16 and 15 to be made upon the card $a$ through the medium of the inking ribbon 57, while at the same time, the punch 61 will have been forced rearwardly, as previously described, for cutting away a relatively small portion of the lower lefthand corner of the card $a$, as shown more clearly in Figures 16 and 17.

These printing and punching operations are made almost instantly following the successive tripping of the detents 70 and 71 and before the cam 49 has made one complete revolution from its starting position.

Immediately following these printing and punching operations which are felt by the operator while holding the card in the guide 10', the card with the impressions thereon will be immediately withdrawn from the machine to be handed to the borrower as a record of the time of borrowing or returning of the loaned article with his identification number or other character also impressed thereon by the type plate 15 on the type card $a'$.

The rotation of the counter-shaft 45 and cam 49 is relatively slow as compared with the speed of the motor, due to the gear ratio between the worm 43 and its gear 44, so that the operator may withdraw the printed card before the cam 49 makes one complete revolution, at which time the detents 70 and 71 and their operating members 75, 79 and 84 will have been returned to their normal positions by the springs 73 and 74, so that the continued rotation of the pawl 67 about the axis of the shaft 45 will cause the heel of the pawl to trail against the detents 70 and 71, thereby tripping the pawl from holding engagement with the ratchet wheel 68, and allowing said pawl to be returned to its operating position by the spring 69.

The heel of the pawl is provided with an offset shoulder 87 adapted to engage a fixed stop 88 on the transmission case 40 for stopping the further rotation of the pawl 67 and cam 49 under the momentum immediately upon the completion of each revolution of those parts, thus completing one cycle of movement for the printing and punching operation, at which time the pawl 67 and cam 49, together with the detents 70 and 71 and card actuated parts controlling the same, will be restored to their starting positions.

These operations may, of course, be repeated on the same or different cards, but when the same card is used for receiving additional impressions from the type plates 16 and 15, it is evident that the punching out of the lower left-hand corner of the card will allow the upper wall of the cut out portion to be moved downwardly a distance corresponding to the cut out so that when the previously printed and punched card has been re-inserted into its guide opening 10' the upper wall of the cut out will be brought into engagement with the top shoulder 60 of the punch 61, ready for a repetition of the printing and punching operations upon the same card.

It therefore follows, that the continuous printing and punching operations upon the same card will be in successive stages from the lower end upwardly on said card, but these operations are limited to about half the length of the card so that the upper end of the latter may always be accessible to the operator for controlling said operations.

The means for limiting the downward movement of the card is best shown in Figure 4 in which the platen 38 is provided with a stop shoulder 89 located a distance below the platen members 37 and 37' approximately equal to one-half the length of the card, more or less, said platen being also provided with a guard plate 90 just at the inside of the shoulder 89 to direct the lower end of the card onto the shoulder as the card is moved step by step downwardly by the operator, following each printing and punching operation upon the same card.

*Ribbon feed mechanism*

As previously intimated, the inking ribbon 57 extends across the printing faces of the type plates 15 and 16 and therefore across the front face of the relatively stationary platen 36' and thence around the ends of said platen and rearwardly therefrom around suitable guide rods 91, the ends of said ribbon being wound upon suitable reels 92 and 92', as shown more clearly in Figures 2 and 7 to 11 inclusive and Figure 16.

These reels are rotatively mounted upon separate shafts 93 and 93' which are secured to the underside of the lid 5 to extend downwardly therefrom when the lid is closed, it being understood that the entire ribbon feeding and supporting mechanism is mounted upon the lid to move therewith so that when the lid is open the various parts of the mechanism are readily accessible for repairs and adjustments.

The inking ribbon is wound in reverse directions upon their respective reels 92 and 92', one of which is adapted to be rotated to wind the ribbon thereon at each printing operation. For this purpose a pair of ratchet wheels 94 are loosely mounted upon their respective shafts 93 and 93' and are provided with clutch pins 95 engaging in sockets in the adjacent ends of the hubs of the corresponding reels, as shown more clearly in Figure 10.

These reels 92 and 92' are displaceable axially at will from their respective shafts, but are held against accidental displacement by detents 96 which are mounted in slots in the adjacent ends of the shafts of the posts 93 and 93' and are provided with slots 96' and receiving pivotal pins 95' on the posts, the detents being normally arranged transversely of the respective posts, but may be moved endwise and turned so as to extend axially of the posts to allow the reels to be removed axially from the corresponding ratchet wheels 94, as shown more clearly in Figure 10.

A lever 97 is centrally pivoted at 98 to the underside of the lid 5 between the reels 92 to extend in opposite directions from its pivot beyond the supporting posts for said reels, as shown more clearly in Figures 7 to 11 inclusive, said lever being provided at one end with an extension 97' to which is pivotally connected one end of a slide rod or bar 99 having its other end slotted at 99' for receiving a guide pin 100 on the underside of the lid 5, as shown more clearly in Figure 7.

This slide rod 99 is adapted to be moved rearwardly against the action of a retracting spring 102 by the corresponding movement of the platen 38 to its printing position, and for this purpose the upper portion of the platen is provided with a forwardly projecting flange 38'' upon which is mounted an adjusting screw 101 which is arranged to engage the front end of the slide bar 99 as the platen is moved rearwardly for effecting a corresponding rocking movement of the lever 97 about its pivot 98 said screw being held in its adjusted position by a lock nut 101' as shown more clearly in Figures 7, 17 and 18.

Suitable feeding pawls 103 are pivotally mounted at 103' upon the lever 97 at opposite sides of its pivot 98, and are adapted to be alternately moved into and out of engagement with their respective ratchet wheels 94 so that when either one of the pawls is in engagement with its ratchet wheel, the rocking movement of the lever 97 will cause the rotation of the corresponding reel for winding the ribbon 57 thereon, and unwinding it from the other reel, each active pawl being yieldingly held in engagement with the teeth of its ratchet wheel by a suitable spring, shown more clearly in Figure 9.

It is now clear that during each rearward movement of the platen 38 to its printing position, similar motion will be transmitted through the slide rod 99 to the lever 97, thereby operating the active pawl into engagement with its ratchet wheel for feeding the ribbon 57 in one direction.

Additional pawls or detents 104 are pivoted at 104' to the underside of the lid 5 at opposite sides of the pivot 98 of the lever 97 for engaging and holding the active ratchet wheel 94 and its reel 92 against return movement, said pawls being spring-pressed into engagement with their respective ratchet wheels, as shown more clearly in Figure 9.

Suitable means is provided for tripping the feeding and holding pawls for each ratchet wheel from their active positions and allowing the feeding and holding pawls for the other ratchet wheel to be brought to their active positions as the ribbon approaches the end of its unwinding movement from either reel, and for this purpose a lever 105 is centrally pivoted at 106 to the underside of the lid 5 substantially midway between the reels 92 and 92' to extend in opposite directions from its pivot some distance beyond said reels, and is provided near its opposite ends with downwardly projecting slotted flanges 107 for receiving adjacent portions of a ribbon 57, as shown more clearly in Figures 8, 10 and 11.

The ribbon 57 is provided near both ends with clips 108 of relatively greater width than the slots in the flanges 107 so that as the ribbon continues to unwind from one of the reels the clip 108 will engage and operate the adjacent end of the lever 105 in the direction of movement of the ribbon, thereby rocking the lever from the position shown by full lines to the position shown by dotted lines in Figure 8.

The lever 105 is provided with a central rearwardly projecting arm 109 to rock therewith, and is guided in a grooved guide member 110, as shown more clearly in Figures 8, 9 and 11.

A rock arm 111 shown in Figures 9, 10 and 11, is pivoted to the post 106 co-axial with the axis of movement of the lever 105 to extend from said pivot in the direction of, and parallel with, the arm 109 of the lever 105, and has its rear end guided in a groove in the guide member 110, as shown more clearly in Figure 11.

These rocker arms 109 and 111 are arranged in spaced parallel relation to receive between them a U-shaped spring 112, as shown more clearly in Figures 9 and 11, one end of the spring being pivoted at 113 to the lever 105, while its other end is pivoted at 113' to the rocker arm 111 so that when the arm 109 is rocked in one direction by the clip 108 on the ribbon 57, the pivotal pin 113 will be moved from one side of a direct line between the pivots 113' and 106 to the opposite side of said direct line, thereby reversing the position of the spring 112 and causing the rocker arms 109 and 111 to move in opposite directions.

The rocker arm 111 is pivoted intermediate its ends at 114 to the central portion of a slide bar 115 which extends diametrically across the axes of the ratchet wheels 94 and reels 92 and 92' and is provided with slots 116 for receiving adjacent portions of both of the reel-supporting posts 93 and 93', said slide bar being disposed in a plane of the feeding pawls 103 and having its opposite ends in more or less close contact with the teeth of the pawls, as shown more clearly in Figure 9.

Under these conditions the oscillatory movement of the rocker arm 111 in one direction will cause a corresponding endwise movement of the slide bar 115 for tripping the previously active pawl 103 and allowing the opposite pawl to move to its active position, thereby reversing the direction of movement of the inking ribbon through the medium of the lever 97 and its connections with the platen 38.

The rocker arm 111 is also located in the plane of, and between, the holding pawls 104 having their heels in more or less close proximity to the lengthwise edges of the rocker arm 111 whereby the movement of said rocker arm in one direction by the rocking action of the lever 105 will effect the tripping of one of the pawls from its holding position and allow the other pawl to engage its corresponding ratchet wheel.

In other words when the rocker arm 111 is moved in the direction of one of the ratchet wheels it will effect the tripping of the feeding pawl 103 and holding pawl 104 and at the same time allow the pawls of the other ratchet wheel to move into active engagement therewith.

Operation

Assuming that the motor 41 is in operation, thereby effecting the continuous rotation of a counter-shaft 45, and ratchet wheel 68, and that the clutch pawl 67 is held out of engagement with the ratchet wheel by means of the detents 70 and 71, due to the absence of the card $a$ in its guide slots 10 and 64, under which conditions the sleeve 48 and its cam 49 will be at rest with the low point of the cam in engagement with the roller 51 on the platen 38, which latter will also be at rest against the cam.

Again assuming that a patron wishes to borrow an article, such patron will present his card to the librarian bearing his or her identification number or other character. The librarian then selects from his files a card bearing this identification character in the form of a type plate 15, which card is then inserted in the guide slot 14 in the lid 5 until its lower end is seated against the stop 55, Figure 5.

The borrower's card is then handed to the librarian by whom it is inserted in the other guide slot 10' until limited by the engagement of its lower edge with the shoulder 60 on the punch 61, Figure 17. This insertion of the card $a$ in its guide 10' will rock the member 75, Figure 18, thereby effecting the endwise movement of the member 79 to cause its shoulder 81 to engage the pin 83 and thereby trip the detent 70 from holding engagement with the heel of the pawl 67.

Then, as the downward movement of the card $a$ continues, it will engage and operate the lever 84 to trip the other detent 71, and thereby allow the pawl 67 to be forced into engagement with the teeth of the then rotating ratchet wheel 68 by means of a spring 69.

The pawl 67 which is pivoted to the end face of the cam sleeve 48 will then be moved around the axis of the shaft 45 to cause the rotation of the cam 49 and resultant operation of the platen 38 to its printing position for printing the date of borrowing from the registering type plate 16 onto the rear face of the card $a$ while at the same time the platen, and by the same operation of the platen, the imprint of the type 15 on the card $a'$ will be impressed upon the same side of the card $a$ in line with the date impressions.

It will, of course, be understood that before this printing operation takes place the type bar 13 will have been adjusted by the hand piece 25 to bring the desired type plate 16 into registration with the platen member 37.

The rearward movement of the platen 38 to its printing position will cause the punch 61 to be moved simultaneously in the same direction for cutting away the lower lefthand corner of the card as indicated as $a''$, Figure 25.

This rearward movement of the platen 38 will also cause the operation of the supporting lever 97 for the feeding pawls to be operated in the same direction through the medium of the slide rod 99 for feeding the ribbon endwise a relatively short distance, this feeding of the ribbon being intermittent or at each rearward movement of the platen to its printing position.

It is, of course, understood that immediately following each printing operation both cards $a$ and $a'$ will be withdrawn from the machine with the time of borrowing printed thereon and returned to the borrower, while the other card $a'$ will be returned to the files of the library ready for re-use for the same borrower.

These operations may be repeated upon the return of the borrower's card for receiving the date of return.

That is, the same borrower's card is presented to the librarian each time an article is borrowed or returned, and the dates of borrowing and return are successively impressed thereon by the operations previously described from the bottom upwardly, the successive printing operations being permitted by the gradual cutting away of the lower lefthand edge of the card during each printing operation, the successively cutaway portions being arranged to determine the line spacing of the printed impressions on the card.

As previously stated, the distance of the limiting stop 89, Figure 4, below the platen members 37 and 37' is approximately equal to one-half the length of the card so that successive impressions may be made thereon from either end of the card approximately half its length, and these impressions may be made on both sides of the card by simply reversing the same, thereby utilizing practically the entire area of both sides for receiving the dates of borrowing and return.

As the ribbon approaches the limit of its unwinding movement from either reel the lever 105 will be operated by said ribbon to effect the releasing of the previously active feeding pawls for one reel and the simultaneous engagement of the feeding pawl of the other reel for automatically reversing the direction of feed of the ribbon from one reel to the other.

Whenever it is necessary to replace the type plates 16 the bar 13 may be withdrawn upwardly by hand from its guide 12 after which the spring 20 may be depressed inwardly to allow the type plates 16 to be withdrawn from the lower end of the type bar and replaced by other type plates having different date carriers.

The operations of the various detail mechanisms have been heretofore described.

The various mechanisms of the machine and their manner of assembly within a single housing are particularly simple, practical and durable, but obviously various changes may be made without departing from the spirit of the invention.

What I claim is:—

1. In a printing machine of the character described, a printing mechanism including a platen, a type-carrier, and an inking ribbon movable between the type carrier and platen, in combination with a guide for guiding a card to be printed between the platen and inking ribbon, said card being adapted to be inserted into and removed from the guide by hand, a power-driven rotary shaft, means actuated by the insertion of the card into the guide for causing the transmission of motion from the shaft to the platen, and means actuated by the platen for feeding the ribbon endwise.

2. In a printing machine of the character described, a printing mechanism including a platen, a type-carrier, and an inking ribbon, in combination with means for guiding a card to be printed between the platen and inking ribbon, said card being adapted to be inserted into and removed from the guide by hand, a motor, means controlled by the insertion of the card into the guide for transmitting motion from the motor to the platen, means actuated by the platen for feeding the ribbon endwise, a punch for cutting away a portion of the card, and means actuated by the platen for operating the punch.

3. In a printing machine of the character described, a type-carrier, a platen movable into and out of printing co-action with the type of the carrier, the article to be printed being adapted to be inserted by hand between the platen and type-carrier, a motor, means including a clutch for transmitting motion from the motor to the platen, a movable member actuated by said article when the latter is inserted between the platen and type-carrier, and means actuated by said movable member for causing the engagement of the clutch to effect the operation of the platen.

4. In a card-printing machine into which the card is adapted to be inserted and removed by hand, a printing mechanism including a platen, an inking ribbon, and a type carrier adjustable at will to register its type with the platen, in combination with a continuously rotating element, means including a clutch for transmitting motion from said element to the platen for moving the latter to its printing position, means actuated by the insertion of the card for engaging said clutch, and means actuated by the platen for shifting the ribbon endwise relatively to the type carrier.

5. In a card-printing machine into which the card is adapted to be inserted and removed by hand, a stop for limiting the movement of the card into the machine, a printing mechanism including a platen and a type carrier, in combination with card-controlled power-driven means for moving the platen into printing co-action with the type-carrier for printing upon the card, and means actuated by the platen for cutting away the portion of the card engaged with the stop to allow further movement of the card into the machine.

6. In a card printing machine into which the card is adapted to be inserted and removed by hand, a printing mechanism including a platen, an inking ribbon, and a type carrier, in combination with card-controlled power-driven means for moving the platen to its printing position, means actuated by the platen for shifting the ribbon endwise relatively to the type carrier, and means, operable at will, for feeding the type-carrier step-by-step into the machine to register different portions of its type with the platen.

7. In a machine for printing the dates of borrowing and return of a circulating-library-card in which the card is inserted into and removed from the machine by hand, the combination with a platen reciprocally movable toward and from the card, of power-driven rotated means including a clutch brought into action by the insertion of the card into the machine for moving the platen toward the card, and a type-carrier movable at will to and from a position between the platen and card for receiving pressure from the platen and impressing the type upon the card.

8. In a machine for receiving a card to be printed, the combination with a slidable type-carrier adapted to be placed at will adjacent one surface of the card, power-driven rotary means including a card-controlled clutch for pressing the type carrier against the card for making impressions of the type thereon.

9. In a card-printing machine, co-operative printing elements, one of which is movable into and out of printing co-action with the other, a guide for directing the card between said elements, a stop for limiting the inward movement of the card along said guide, a continuously rotating member, means including a clutch for transmitting motion from said member to the movable printing element, and means actuated by the insertion of said card into the guide for causing the engagement of the clutch.

10. In a card-printing machine, a fixed platen having laterally spaced guides, separate type-carriers slidable in said guides, means for guiding the card to be printed slidably across the type faces of both carriers, a stop for limiting the inward movement of the card into the guiding means, a movable platen for pressing the card into printing coaction with the type of both carriers simultaneously, a continuously rotating member, means including a clutch for transmitting motion from said member to the movable platen, and means actuated by the insertion of the card into its guide for causing the engagement of the clutch.

11. In a card-printing machine, a fixed platen having a guide, a type carrier having a plurality of rows of type arranged in sequence lengthwise thereof, said carrier being slidable along the guide to successively bring each row of type to a printing position, means for guiding the card slidably across the face of the type, a movable platen for pressing the card into printing coaction with the row of type in said position, a continuously rotating member, means including a clutch for transmitting motion from said member to the movable platen, and means actuated by the insertion of the card in its guiding means for causing the engagement of the clutch.

12. In a card-printing machine, a fixed platen having laterally spaced guides, separate type-carriers slidable in said guides, means for guiding the card to be printed slidably across the type faces of both carriers, a stop for limiting the inward movement of the card into the guiding means, a movable platen for pressing the card into printing coaction with the type of both carriers simultaneously, a continuously rotating member, means including a clutch for transmitting motion from said member to the platen and means brought into action by the insertion of the card in its guiding means for causing the engagement of the clutch.

13. In a card-printing machine of the character described, a type-plate carrier, a plurality of type plates arranged in sequence upon the carrier, a guide along which the carrier is movable to present each type plate to a printing position, the card being movable across the type face of the plates, a movable platen for pressing the card into printing coaction with the type in said position, a continuously rotating element, means including a clutch for transmitting motion from said element to the movable platen, and means actuated by the movement of the card across the type plates for engaging the clutch.

LLOYD W. MOULTON.